United States Patent [19]

Thaler et al.

[11] Patent Number: 4,970,036

[45] Date of Patent: Nov. 13, 1990

[54] PROCESS FOR PRODUCING GREEN COMPACTS BY MOLDING SINTERABLE CERAMIC MIXTURES BASED ON SILICON NITRIDE

[75] Inventors: Hubert Thaler; Dietrich Lange, both of Kempten; Karl A. Schwetz, Sulzberg, all of Fed. Rep. of Germany

[73] Assignee: Elektroschmelzwerk Kempten GmbH, Munich, Fed. Rep. of Germany

[21] Appl. No.: 375,867

[22] Filed: Jul. 5, 1989

[30] Foreign Application Priority Data

Jul. 21, 1988 [DE] Fed. Rep. of Germany ....... 3824835

[51] Int. Cl.$^5$ .................. C04B 33/28; C04B 33/30
[52] U.S. Cl. .................................. 264/86; 264/63; 264/211.11; 264/328.2
[58] Field of Search ................ 264/63, 86, 211.11, 264/328.2; 501/97

[56] References Cited

U.S. PATENT DOCUMENTS

| | | | |
|---|---|---|---|
| 4,184,884 | 1/1980 | Jong | 264/65 |
| 4,296,065 | 10/1981 | Ishii et al. | 264/325 |
| 4,814,128 | 3/1989 | Lieberman | 264/65 |
| 4,834,928 | 5/1989 | Su | 501/97 |

FOREIGN PATENT DOCUMENTS

| | | |
|---|---|---|
| 3525752 | 3/1986 | Fed. Rep. of Germany . |
| 1052590 | 12/1966 | United Kingdom . |
| 1054631 | 1/1967 | United Kingdom . |
| 2163780 | 3/1986 | United Kingdom . |

OTHER PUBLICATIONS

Rabinovich et al, J. Material Science, 1982, 17(2), pp. 323–328.
Hartmann et al, Phys. Colloq. 1986, pp. C1-79–C1-83.
Chemical Abstracts, vol. 96, 1982, No. 204230s.
Chemical Abstracts, vol. 96, 1986, No. 75586y.
Chemical Abstracts, vol. 104, 1986, No. 191475g.
Ceramic Powders, 1983–"Some Aspects of Slip Casting of Silicon Nitride and Silicon Carbide"–Persson et al, pp. 735–742.
Chemical Abs., vol. 108, 1988, 108: 80845r–Khater, et al, "Effects of Some Lignosulfonates Additives on Some . . . Panels".
Borregaard Inds. Ltd., N-1701–"Chemical and Physical Data on Borregaards Lignin Chemicals".

*Primary Examiner*—James Derrington
*Attorney, Agent, or Firm*—Burgess, Ryan & Wayne

[57] ABSTRACT

The invention relates to a process for producing green compacts by the slip-casting process, injection-molding process or extrusion process from sinterable mixtures based on a starting powder mixture containing silicon nitride, and, if appropriate, aluminum nitride and/or alumina and other oxides as sinter aids. The dispersant and binder used is a magnesium chloride hydrate as a mixture with magnesium oxide and water and, after molding, the mixtures are hardened at temperatures from 30° to 60° C. In addition, ceramic fibers, such as silicon carbide, can also be processed as fillers. The green compacts thus produced are sufficiently stable, so that they can be worked mechanically.

7 Claims, No Drawings

4,970,036

PROCESS FOR PRODUCING GREEN COMPACTS BY MOLDING SINTERABLE CERAMIC MIXTURES BASED ON SILICON NITRIDE

BACKGROUND OF THE INVENTION

1. Field of the Invention

Polycrystalline articles which contain silicon nitride and which can be produced by sintering with or without application of pressure from starting powders containing finely dispersed silicon nitride, and appropriate aluminum nitride and/or alumina and other oxides, are known. Owing to their properties of such high strength at room temperature, high impact resistance, low thermal expansion and good wear properties, they can be used in many fields of application.

2. Description of the Related Art

Because of the limited scope of shaped articles provided by conventional hot-pressing processes, pressureless sintering processes are preferred for the production of components of complex shape wherein the starting powders must be compacted to form green compacts of the desired final shape before they can be sintered by heating to the required temperatures.

Among the known molding processes for the production of green compacts in the form of, for example, thin plates, rods, thin-walled crucibles or tubes, extrusion processes, injection-molding processes and especially slip-casting processes have proved useful. It is important that green compacts of adequate stability are produced so that they can be mechanically worked before sintering, since working after sintering is, because of the hardness of the silicon nitride-based sintered material, very expensive and possible only with diamond tools.

A reference to slip-casting of ceramic materials based on silicon nitride is found in GB-A-1,052,590. In this case, organic solvents are used exclusively as a liquid dispersion media in which the polymeric cyclopentadiene, used as a defluocculant, is readily soluble. In the examples, however, no data on the sintered densities obtained were given for the use of silicon nitride powder with xylene as the dispersion medium and subsequent sintering. Moreover, it was pointed out that, when water was used as the dispersion medium, it was virtually impossible to obtain castings of satisfactory properties because most of the ceramic materials contain impurities which react with water to form by-products which adversely affect the physical cohesion of the resulting green compacts.

The injection-molding of ceramic powders which are based on silicon nitride and contain up to 30% by weight of yttrium compounds or compounds of the lanthanides, in addition to trace quantities present in the raw material, of Fe, Ca, Mg or compounds thereof, which are processed together with an organic binder to form green compacts, is disclosed in U.S. Pat. No. 4,296,065.

A further reference to the possible slip-casting of ceramic powders on a sialon base, such as $Si_3N_4$, AlN and/or $Al_2O_3$, together with sinter aids such as $Y_2O_3$ or oxides of the lanthanides, a dispersion of a solids content of 50–70% by weight in water being recommended as advantageous, can be derived from U.S. Pat. No. 4,184,884.

In the meantime, the view has generally gained acceptance that success or failure both in the slip-casting process and in the injection-molding process depend largely on the nature of the organic binder used.

Good cohesion of the individual powder particles can be achieved by means of temporary organic binders. The temporary binders must be removed as a result of which defects or cavities are formed in the sintered compact before or at the latest during the actual sintering process. Cracked locations or fracture locations are pre-programmed. With water alone as the binder or dispersant, there is a risk of ceramic powders based on silicon nitride and/or aluminum nitride reacting with the water with decomposition (cf. DE-C-3,525,752).

The properties of water-based slip-casting mixtures of silicon nitride powder and oxidic sinter aids and inorganic additives have been investigated. Green densities of about 50% of the theoretical density were achieved (cf. E. M. Rabinovich et al., J. Mater. Sci. 1982, 17(2), pages 323–328; abstracted in C.A. Volume 96, 1982, No. 204, 230 s, and M. Persson et al., J. Mater. Sci. Monogr. 1983, 16 (Ceram. Powders), pages 735–742; abstracted in C.A. Volume 99, 1983, No. 75,586 y).

In investigations into the possible influence of sinter aids on the slips, it was found that after the addition of magnesium compounds (MgO or $Mg(HCO_3)_2$), the viscosity increased considerably. In order to obtain a castable suspension, dilution was necessary which then led to green compacts of only 35 to 40% of theoretical density (cf. W. J. A. M. Hartmann et al., J. Phys. Colloq. 1986, pages C1-79–C1-83; abstracted in C. A. Volume 104, 1986, No. 191,475 g).

It is also known to use, instead of temporary organic binders, those binders which can be hydrolyzed or decomposed with the formation of a temporary bond which is then not removed in the firing process but can be converted into a refractory oxide bond. As examples of such binders, alkyl silicates were mentioned which form an $SiO_2$ bond in the firing process. Organic aluminum compounds or magnesium oxychloride or magnesium oxysulfate, which can form an aluminum oxide bond or magnesium oxide bond, were also mentioned (cf. GB-A-1,054,631). As can be seen from the examples, however, only highly porous end products having a porosity of 44%, or 32%, corresponding to approximately 56–68% of theoretical density, were obtained when a mixture of $Si_3N_4$ powder and ethyl orthosilicate in aqueous ethanol solution was cast and the green compacts then fired at temperatures of up to 1350° C. The formation of a refractory oxide bond alone, expected under the indicated conditions, was insufficient to obtain sintered silicon nitride products of high final density.

The state of the art is that, for the production of silicon nitride-based ceramic masses which are to be processed for molding by the slip-casting process, injection-molding process or extrusion process, organic binders and/or organic dispersants are preferred, since relatively good cohesion of the ceramic powder particles before the sintering process is ensured, but at the price of poorer properties of the finished sintered product.

By contrast, using water and/or inorganic additives, only relatively low density green compacts are obtained, which are not sufficiently stable for mechanical working before the actual sintering process.

The processing of water-based ceramic mixtures is preferred to processing based on organic additives, for economic and environmental reasons, and to avoid interfering influences on the properties of the finished sintered products. It is desirable to provide a process for producing green compacts by molding according to the slip-casting process, injection-molding process or extrusion process from sinterable ceramic mixtures based on dispersants and binders containing starting powder mixtures, which contain silicon nitride, if appropriate aluminum nitride and/or alumina and other oxides as sinter aids, and water. Such a process guarantees not only an adequate stability for mechanical working and a relatively high density of the green compacts, but also an interference-free sintering step, producing homogeneous, polycrystalline sintered products having high final densities.

SUMMARY OF THE INVENTION

According to the invention, stable dense green bodies are provided by using a magnesium chloride hydrate mixed with magnesium oxide and water as the dispersant and binder and, after molding, fully hardening the masses at temperatures in the range from about 30° to about 60° C.

DETAILED DESCRIPTION OF THE INVENTION $MgCl_2$ forms several hydrates with water of which the existence of 5 hydrates with 2, 4, 6, 8 and 12 $H_2O$ is known from the literature. The commercial product is usually the hexahydrate which is converted into the tetrahydrate at a temperature above 100° C. It is also known that $MgCl_2$ solutions form with MgO a series of basic chlorides (magnesium oxychlorides) which have industrial importance as a so-called magnesia binder, which harden in air but are not resistant to water.

For use according to the invention, preferably $MgCl_2.6H_2O$ and MgO in a molar ratio of about 1 to 2:1 to 3 are used. The required quantity of water depends on whether the ceramic mixtures are to be processed by the slip-casting process, the injection-molding process or the extrusion process. That is, the quantity of water is in each case such that it is sufficient for preparing castable or kneadable masses.

For producing the ceramic mixtures to be processed according to the invention, finely dispersed $Si_3N_4$ powders having a particle size of 2 $\mu$m and finer are preferably used. The specific surface area, measured according to BET, can be utilized as a measure of the particle size. Powders having a specific surface area in the range of 4–10 $m^2/g$ have proven to be particularly useful. In addition, sinter aids are also used, which assist the compaction, after molding, of the green compacts during the subsequent sintering and which are selected from the group comprising the oxides of Al, Si, Y, Zr, Hf, the lanthanides and mixtures thereof. Lanthanum aluminates prepared from $La_2O_3$ and $Al_2O_3$ have proven to be particularly useful. The quantity of the sinter aids can vary from about 1 to about 25% by weight, preferably about 1 to about 5% by weight, each relative to the total weight of the powder mixture.

Apart from the $Si_3N_4$ starting powder, powders based on aluminum nitride and/or alumina can also be used which, together with the sinter aids, give the known sialons as end products, wherein Si atoms and N atoms are partially replaced by Al atoms and O atoms. Ceramic starting powders and sinter aids should in this case have approximately the same particle sizes as the silicon nitride powder.

It is also possible to use fillers in the form of ceramic fibers which are usually employed as whiskers, which are hair-like crystals with aspect ratios of 1:10 to 1:100. Examples of ceramic fibers are those of SiC, $SiO_2$, $Al_2O_3$, $ZrO_2$, BN and $Si_3N_4$; SiC fibers being preferred. With whisker contents of up to about 40% by weight, relative to the dry weight of the ceramic mixture, the stability of the green compacts is not adversely affected.

For preparing the castable or kneadable ceramic mixtures, the solids are processed, together with the particular quantity of water required, by conventional known methods, for example by stirring in mixing and grinding units. When silicon nitride powder is ground in water, a pH value of about 9.8 is obtained. At this basicity, $MgCl_2.6H_2O$ dissolves and precipitates as magnesium hydroxide $Mg(OH)_2$, whereby the effectiveness of the binder is lost. By adding acid or suitable buffer solutions in a known manner, the pH value of the slip is adjusted to values of <9.5, preferably <9.0 and especially 8.5. As a result, the effectiveness of the chloride binder is preserved. For preparing a slipcasting mixture, the $MgCl_2$ hydrate +MgO addition according to the invention is admixed right at the start. When preparing an injection-molding mixture or extrusion mixture, the additive according to the invention is not added to the actual kneading mixture until immediately before processing.

The quantity of $MgCl_2$ hydrate +MgO additive of the invention is preferably such that an oxide content, originating from the sinter aids and the additive, in the sintered product of about 30% by weight is not exceeded, and preferably the oxide content is in a range of about 10–15% by weight, in each case relative to the total weight.

After the casting masses or kneading masses have been formed into the desired shape, the green compacts are hardened at slightly elevated temperatures, which are preferably between about 40° and 50° C.

During the hardening process, the mixtures of magnesium oxychloride, known as magnesia binders, are formed, it being assumed that the presence of silicon nitride or mixed crystals thereof possess a reaction-accelerating effect, so that the hardening process is virtually complete within 4 to 5 hours in the temperature range indicated.

The green compacts produced by molding with the aid of the additive according to the invention, which are understood to be green compacts with open porosity, that is, with pores open towards the surface, have a green density of at least 55%, preferably at least 65% TD, i.e. of the theoretically possible density. The green compacts are of good quality, that is, they have fine pores with uniform solids distribution. No formation of cracks or incipient formation of cracks are detectable during hardening.

The green compacts have adequate stability and can be mechanically worked after hardening. To improve the storage stability, the green compacts can subsequently, i.e., before the actual sintering, be subjected to a calcining process at temperatures in the range from about 400° to 800° C, preferably at about 600° C. It is assumed that, under these conditions, the magnesium oxychloride compounds are partially converted into magnesium oxide bonds, a process which then takes place virtually completely during the actual sintering process.

By means of exploratory sintering trials, under conventional known conditions (1750° to 1900° C., $N_2$ atmosphere), it was found that these green compacts can be sintered to form polycrystalline, silicon nitride-based articles having a theoretical density of at least 98% TD.

The ceramic casting mixtures which can be prepared with the additive according to the invention can also be used in slip die-casting machines in which porous plastic-coated metal molds are used in place of the plaster molds. This method is suitable in particular for the economical production of hollow ceramic parts of complex shape.

EXAMPLE 1

The following mixture was used for producing a crucible by slip-casting:

| | |
|---|---|
| $Si_3N_4$ | 87.7% by weight |
| $LaAlO_3$ | 4.0% by weight |
| MgO | 4.5% by weight |
| $MgCl_2 \times 6H_2O$ | 3.8% by weight |

Together with 1.5 times the quantity of water (relative to the weight of the dry powders) and adjusting the pH value to 8.5, the batch was homogenized in a mixing and grinding unit. The suspension formed was degassed to avoid casting defects due to occluded air bubbles. The slip was then cast into the appropriate plaster mold and, after the desired body strength had been established, the excess suspension was poured back into the stock vessel. After the molding had shrunk off the plaster mold, it was taken out and hardened in a drying cabinet at about 50° C. for 4 to 6 hours. The strength and workability of the body was comparable with that of compact steatite.

The crucible was reworked on a turning machine, and an edge suitable for pouring and a stable bottom face were formed on it.

To improve the storage stability, the crucible was calcined for two hours at 600° C.

By means of exploratory sintering trials under the conditions conventional for silicon nitride, 1700°–1900° C. in a nitrogen atmosphere, dense-sintered end products having densities of 3.17–3.24 g/cm³ were obtained from crucibles produced in this way.

EXAMPLE 2

The following mixture was used for extruding a whisker-reinforced ceramic material:

| | |
|---|---|
| $Si_3N_4$ | 87.2% by weight |
| $Al_2O_3$ | 1.2% by weight |
| AlN polytype 15 R | 2.3% by weight |
| $LaAlO_3$ | 3.7% by weight |
| MgO | 4 7% by weight |

Together with twice the quantity of water (relative to the weight of the dry powders), the mixture was homogenized in a mixing and grinding unit and comminuted to a particle size suitable for sintering.

Just before completion of the grinding treatment, 20% by volume of SiC whiskers (relative to the volume of the dry powders) was added and homogeneously distributed in the mixture, without noticeable comminution. The mixture was then dried, deagglomerated and screened.

The actual extrusion mixture was prepared immediately before processing by adding 3.8% by weight of $MgCl_2 \times 6H_2O$ (relative to the weight of the dry mixture) and adding 25% of distilled water (relative to the total powder quantity) in a kneader. The stiff mass was then extruded to give thin-walled tubes.

After hardening of the tubes at 40° C., mechanical working was carried out by turning the outside diameter and cutting the length to the desired dimensions.

The calcining and sintering process was carried out under the same conditions as described in Example 1. Sintered products true to dimensions and having final densities of >98% of theoretical density were obtained from the green compacts.

EXAMPLE 3

The following mixture was used to produce rods of a α-sialon material by extrusion:

| | |
|---|---|
| $Si_3N_4$ | 65.0% by weight |
| $Y_2O_3$ | 9.3% by weight |
| AlN polytype 27 R | 21.0% by weight |
| MgO | 4.7% by weight |

Together with twice the quantity of water (relative to the weight of the dry powders), the batch was homogenized in a mixing and grinding unit and ground to a particle size suitable for sintering. The mixture was then dried, deagglomerated and screened. The actual extrusion mixture was prepared in a kneader, immediately before processing, by addition of 3.8% by weight of $MgCl_2 \times 6H_2O$ (relative to the weight of the dry powder) and by addition of 25% of distilled water (relative to the total powder quantity). The stiff mixture was then extruded into rods of 16 mm diameter. The rods were cut off to an easily handled dimension (120 mm), using a knife, and hardened at 40° C. Rectangular sections of dimensions $8 \times 11 \times 50$ mm³ were produced from the round rods on a milling machine. The 4-point flexural breaking strength of these green compacts was determined to be 10 MPa. In the subsequent sintering (1790° C., nitrogen atmosphere), a sintered density of 98.7% of the theoretical density was reached.

EXAMPLE 4

(Comparison Example)

The powder mixture and the preparation were carried out under the same conditions as in Example 4, with the modification that no magnesium chloride ($MgCl_2 \times 6H_2O$) was added during the working in the kneader. On extrusion of the mixture, handling problems arose due to the fragility of the product, leading to a high reject rate.

Even though the heat treatment steps were carried out in the same way, the strength of the material remained low. Working on the milling machine was not possible, since the low strength of the material did not permit clamping. Nevertheless, a few unworked fragments were subjected to the sintering process. This gave a density of 98.8% of the theoretical density under the same conditions. Accordingly, the strength-enhancing additives have no sinter-inhibiting effect on the ceramic material.

We claim:

1. In a process for producing a green compact by molding according to a slip-casting process, injection-molding process or extrusion process from sinterable ceramic mixtures based on dispersants and binders containing starting powder mixtures, which contain silicon nitride, and optionally aluminum nitride and/or alumina and other oxides as sinter aids, and water, the improvement which comprises using a magnesium chloride hydrate mixed with magnesium oxide and water as the dispersant and binder and, after molding, fully hardening the green compacts at temperatures in the range from 30° to 60° C.

2. A process of claim 1, wherein the dispersant and binder used is a mixture of magnesium chloride hexahydrate and magnesium oxide in a molar ratio of from about 1:2 to 1:3.

3. A process of claim 1, wherein the slip-casting process is employed and the pH value of the mixture is adjusted to a value of less than 9.5.

4. A process of claim 1, wherein, after molding, the mixtures are fully hardened at about 40° to about 50° C.

5. A process of claim 1, wherein the sinterable ceramic mixture comprises a mixture of $Si_3N_4$ or of $Si_3N_4$, AlN and $Al_2O_3$, each as a mixture with up to 25% by weight, relative to the total weight of the powder mixture, of at least one sinter aid selected from the group consisting of the oxides of Al, Si, Y, Zr, Hf, the lanthanides and mixtures thereof.

6. A process of claim 5, wherein at least one ceramic fiber, selected from the group consisting of fibers of SiC, $SiO_2$, $Al_2O_3$, $ZrO_2$, BN and $Si_3N_4$, in an amount up to 40% by weight, relative to the dry weight of the ceramic mixture is used as a filler in the starting powder mixture.

7. A process of claim 1, wherein the green compacts are subjected, after hardening, to a calcining process at temperatures in the range from about 400° to about 800° C.

* * * * *